United States Patent [19]

Nekola

[11] Patent Number: 4,609,204

[45] Date of Patent: Sep. 2, 1986

[54] EXTENSION FOR OUTRIGGER BEAM

[76] Inventor: Randy A. Nekola, 2401 Lakesite Dr., Soddy, Tenn. 37379

[21] Appl. No.: 418,081

[22] Filed: Sep. 14, 1982

[51] Int. Cl.⁴ ........................ B60S 9/12

[52] U.S. Cl. ........................ 280/766.1

[58] Field of Search ............ 280/766.1, 763.1, 765.1; 212/189; 414/694

[56] References Cited

U.S. PATENT DOCUMENTS

| | | | |
|---|---|---|---|
| 2,519,910 | 8/1950 | Kershaw | 212/189 |
| 3,332,699 | 7/1967 | Devys | 280/763.1 |
| 3,521,902 | 7/1970 | Akers | 280/763.1 |
| 3,825,095 | 7/1974 | Clark | 280/766.1 |
| 4,071,147 | 1/1978 | Hornagold | 280/766.1 |
| 4,394,912 | 7/1983 | Epps et al. | 280/766.1 |

FOREIGN PATENT DOCUMENTS

| | | | |
|---|---|---|---|
| 0106843 | 8/1980 | Japan | 280/763.1 |
| 1215223 | 12/1970 | United Kingdom | 280/765.1 |

*Primary Examiner*—David M. Mitchell
*Attorney, Agent, or Firm*—Burns, Doane, Swecker & Mathis

[57] ABSTRACT

An outrigger beam assembly for stabilizing large construction vehicles includes two pivotally connected portions. Mounted to an outer end of a single stage outrigger beam is an extension beam with selectively removable pins securing the extension beam to the outrigger beam. When a vertically aligned pair of pins are removed, the extension beam may be manually pivoted, around a vertical hinge axis passing through the remaining pins, from a working position to a non-working or storage position. Either a locking bar or cooperating apertured ear portions on the extension beam and the outrigger beam may be used to secure the extension beam in the storage position.

10 Claims, 10 Drawing Figures

EXTENSION FOR OUTRIGGER BEAM

BACKGROUND AND SUMMARY OF THE PRESENT INVENTION

The present invention relates generally to outrigger beam structures. More particularly, it concerns an extension beam which is connected to an outer end of an outrigger beam, with the extension beam being selectively pivotable, around a vertical axis, about the outrigger beam from a working position to a non-working or storage position.

Retractable and extensible outrigger assemblies are usable, for example, on certain utility vehicles for the maintenance of stability of the vehicle and prevention of tipping while the vehicle is performing a work function. Such vehicles notably include truck cranes which have to be sufficiently narrow to safely traverse a highway en route to a worksite but need an enlarged pedestal of stability when working at the work site. Usually, two outrigger assemblies are provided on the vehicle, one located rearwardly of the crane and another one forwardly of the crane. Each outrigger assembly normally has one outrigger beam extendable substantially outwardly from each side of the vehicle. A float assembly is located at an outer end of an outermost outrigger beam and has a vertically extendable and retractable plate-like foot for engagement with the ground or other support surface. Vertical extension and retraction of these plate-like feet, commonly known as pads or float pads, is generally accomplished by a jack cylinder.

Difficulties have, however, been encountered with conventional construction vehicles having a single stage outrigger beam because the outrigger spread provided by the single stage outrigger beam is not adequate to stabilize the construction vehicle under some circumstances. For example, with a larger outrigger spread, a mobile crane is allowed to have either a greater lift capacity at the same boom length or the same lift capacity at a longer boom length without, in either case, a decrease in stability for the crane. It is evident that the length of a single stage outrigger beam is limited by the width of the vehicle into which the beam is retractable. Naturally, multi-stage hydraulically extensible outrigger beam assemblies could be used, however, such assemblies are much more expensive, and more complex mechanically, than a single stage outrigger beam assembly would be.

Various arrangements have been disclosed to increase the outrigger spread of a construction vehicle without resorting to multi-stage outrigger structures. When, instead of a multi-stage outrigger beam, an extension beam is secured to the end of a single stage outrigger beam, a longer outrigger spread is afforded without having to resort to a two stage outrigger beam with its accompanying piston and cylinder complications as well as much greater cost and complexity. Such a system would have a lighter weight than a multi-stage outrigger system thereby improving the fuel economy of the vehicle. Alternatively, with the use of a longer outrigger spread, a lighter counterweight could be used thus also decreasing the weight of the vehicle thereby improving its fuel economy and lessening the wear and tear on both the vehicle and the road surface which is traversed by the vehicle.

A road vehicle derrick having two extension beams pivotally mounted to a main beam, about a horizontal axis, is known to the prior art. Secured to each end of the main beam are a pair of hinge members and an associated end of each extension beam is provided with an upper lug and a lower lug with the lugs fitting between the sides of the hinge members. Passing through each hinge member and a respective upper lug is a bolt with a removable pin being employed to connect the lower end of each hinge member to a respective lower lug. When the extension beams are not in use, the pins may be withdrawn and the extension beams pivoted upwardly about the bolts onto a decking of the vehicle. Vertically adjustable supports which help stabilize the construction vehicle are located at outer ends of each of the extension beams. Such a known outrigger structure is disclosed in U.S. Pat. No. 2,519,910 issued to Kershaw. It would be desirable, however, to provide an outrigger extension which is mounted for pivotal movement around a vertical axis since an extension pivotable around a horizontal axis is unsuitable in a large assembly because it is too heavy to manipulate manually. Also, it would be desirable to provide an extension beam which can be secured in a storage position by a locking bar or bracing member.

A truck-mounted scaffold having an outrigger assembly with a pair of telescoping stabilizer bars is also known to the prior art. Each stabilizer bar is provided with a jack post at an outer end thereof with the jack posts being pivotable about a horizontal axis from a stored position to an erect position for use. To retain the jack posts in a folded storage position, a hook is provided. The hook is welded to a flange on each jack position with the hook engaging a loop fixed to one end of each of the channel members. Such an outrigger structure is disclosed by U.S. Pat. No. 3,825,095 issued to Clark. It would be desirable, however, to have an outrigger beam assembly having an extension beam which is pivotable around a vertical axis, for ease of manual handling as explained above, and which can be secured in a storage position by a bracing member or locking bar.

An excavator having a plurality of folding support legs which are mounted for rotation, of somewhat more than 90°, about a vertical axis is also known to the prior art. Such an excavator is disclosed in U.S. Pat. No. 3,987,563 issued Baur. It would be desirable, however, to have a hydraulically extensible outrigger beam to the end of which is pivotally connected an extension beam which may be secured in a storage position by a locking bar.

To extend the outrigger spread of a larger construction vehicle, an extension beam which is pivotable about a vertical axis around an outrigger beam from a storage position to a working position is preferred because manual pivoting of an extension beam around a horizontal axis is not feasible due to the weight of the extension beam. Two examples of outrigger assemblies pivoting around a horizontal axis, but hydraulically powered nevertheless, in lightweight vehicles such as backhoes are disclosed in U.S. Pat. Nos. 4,236,643 and 4,256,433. Conventional jack cylinder and pad assemblies for vehicle outrigger beams are disclosed in U.S. Pat. Nos. 3,990,714 and 4,071,147.

Accordingly, an outrigger beam assembly according to the present invention includes at least one single stage outrigger beam and an extension beam which is pivotally connected to an outer end of the outrigger beam. Securing the extension beam to the outrigger beam are at least two selectively removable pins, each pin passing through cooperating hinge portions on the extension beam and the outrigger beam. When at least one of the pins is removed, the extension beam may be pivoted around a hinge line, which is a vertical axis passing through the remaining pin or vertically aligned pins, to move the extension beam from a working position to a non-working or storage position. A locking bar may be used to secure the extension beam in the storage position such that one end of the locking bar is pinned to a hinge portion on the extension beam and the other end of the locking bar is pinned to a hinge portion on the outrigger beam. In this way, hinge portions which would be pinned together if the extension beam were in a working position are spaced apart. Alternatively a pair of apertures may be provided on the hinge portions such that the apertures become aligned when the extension beam is rotated to the storage position. A pin is inserted through the aligned apertures to secure the extension beam in the storage position.

BRIEF DESCRIPTION OF THE DRAWINGS

A preferred embodiment of the outrigger beam assembly according to the present invention is described with reference to the accompanying drawings wherein like members bear like reference numerals and wherein.

DETAILED DESCRIPTION OF THE PREFERRED EMBODIMENT

Figure 1:
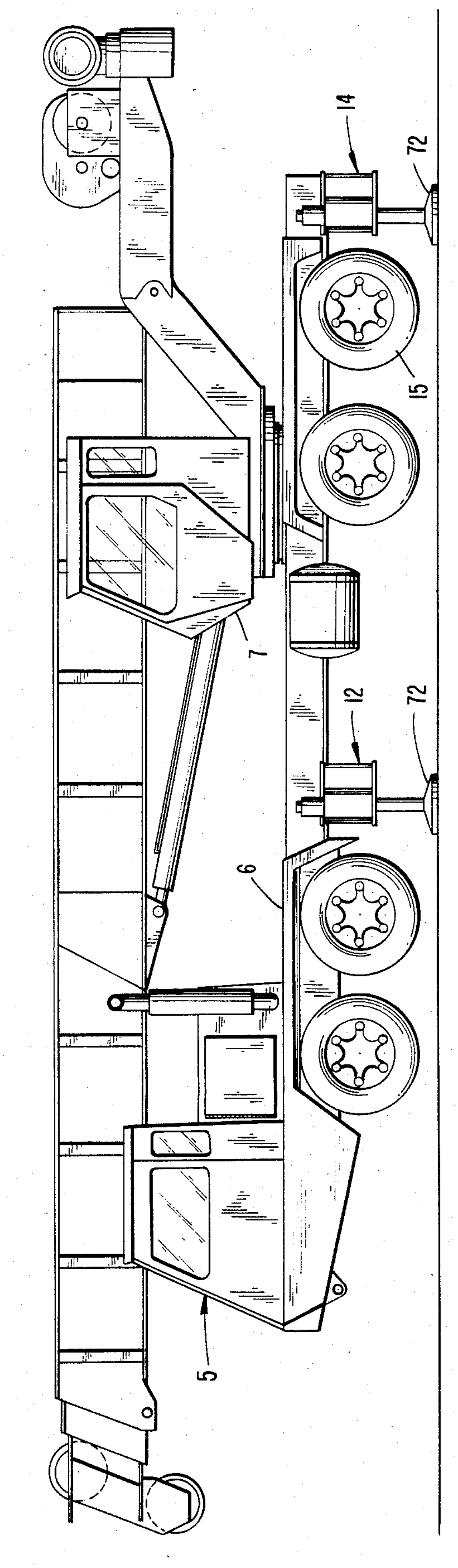
FIG. 1 is a side elevational view of a vehicle provided with outrigger beam assemblies of the present invention secured in a working position.

With reference to FIG. 1, a preferred embodiment of an outrigger beam assembly according to the present invention includes a construction vehicle 5 having a frame 6 and a crane superstructure 7. The vehicle 5 is provided with a front outrigger beam assembly 12 located forwardly of the crane superstructure 7 and a rear outrigger beam assembly 14 located rearwardly of the crane superstructure. The outrigger assemblies 12, 14 are useful for increasing the width of the working platform or pedestal of the crane thus increasing either the lift capacity of the crane at the same boom length or increasing the boom length at the same lift capacity. The vehicle 5 is normally supported on a plurality of tires 15 but is equipped with front and rear outrigger assemblies 12, 14, so that the entire vehicle can be braced if desired.

Figure 2:
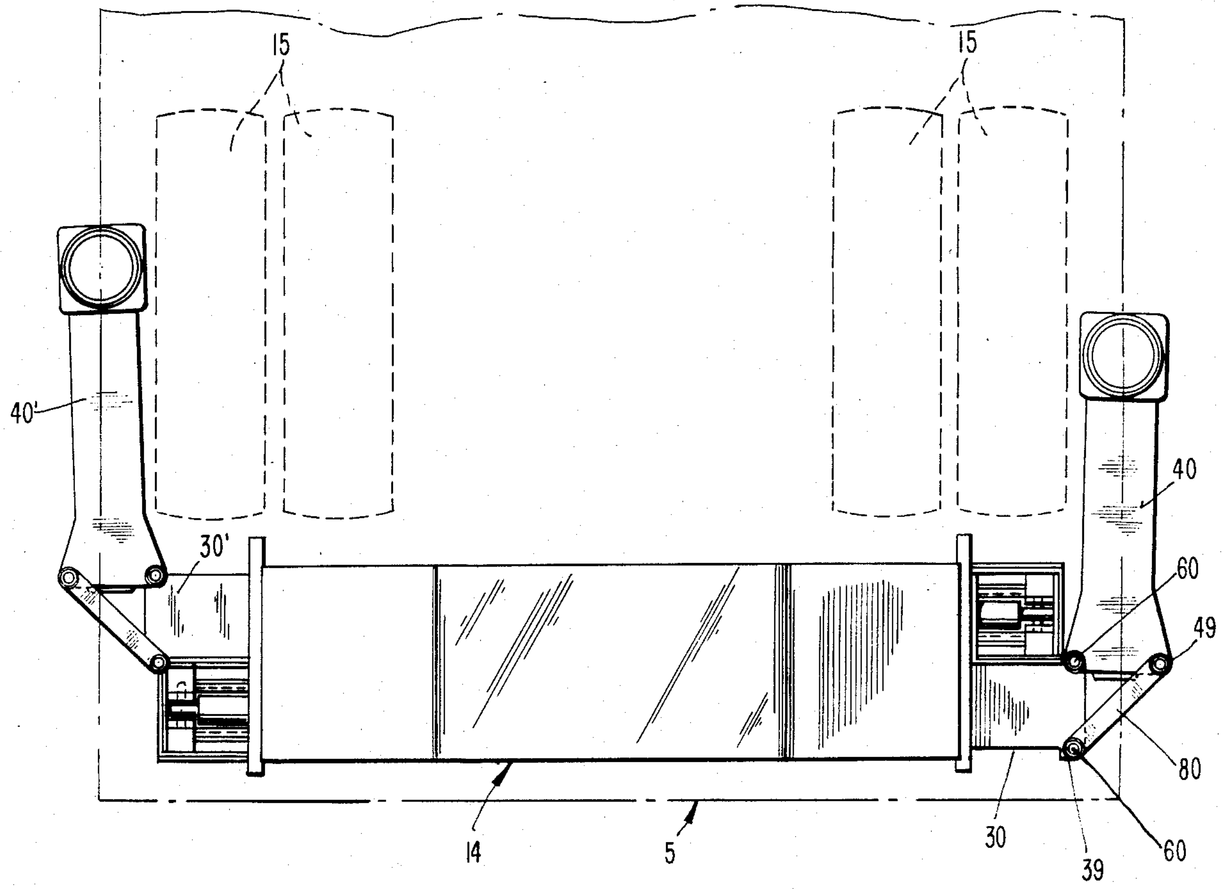
FIG. 2 is a reduced partial plan view of the vehicle of FIG. 1 with the rear outrigger beam assembly having two extension beams and both extension beams being secured in a storage position.

Because the front and rear assemblies are identical, except for their position on the vehicle 5, only the rear assembly 14 will be discussed. With reference now to FIG. 2, the rear outrigger beam assembly 14 has two single stage outrigger beams 30, 30′ and two extension beams 40, 40′. In one preferred embodiment, the total outrigger spread is twenty-five feet with the outrigger beams 30, 30′ each being approximately six feet long and the extension beams 40, 40′ each being approximately two feet long. The outrigger beams 30, 30′ could be extended manually, but in larger construction vehicles the beams are preferably hydraulically extensible because they weigh too much to be easily manipulated manually.

In large vehicles, e.g., mobile cranes, the extension beams 40, 40′ may weigh as much as 350 lbs. An extension beam of this size cannot be easily manipulated because of its weight. If an extension beam 40 of this size were hinged around a horizontal axis the beam would be very difficult to move manually since it would have to be rotated upwardly. If, however, the beam 40 is hinged around a vertical axis, as in the present invention, then, as long as the hinge was adequately lubricated, the beam could be moved by hand since the beam would only have to be rotated sideways.

Since the left and right sides of the rear outrigger assembly 14 are identical except for their position on the vehicle, only the right side will be described in detail. It is understood that the left side of the rear outrigger assembly 14 is identical to the right side. The rear outrigger beam assembly 14 may be located anywhere along a rear portion of the vehicle 5 but is preferably located behind a plurality of rear wheels or tires 15 (shown in dotted outlines).

Figure 3:
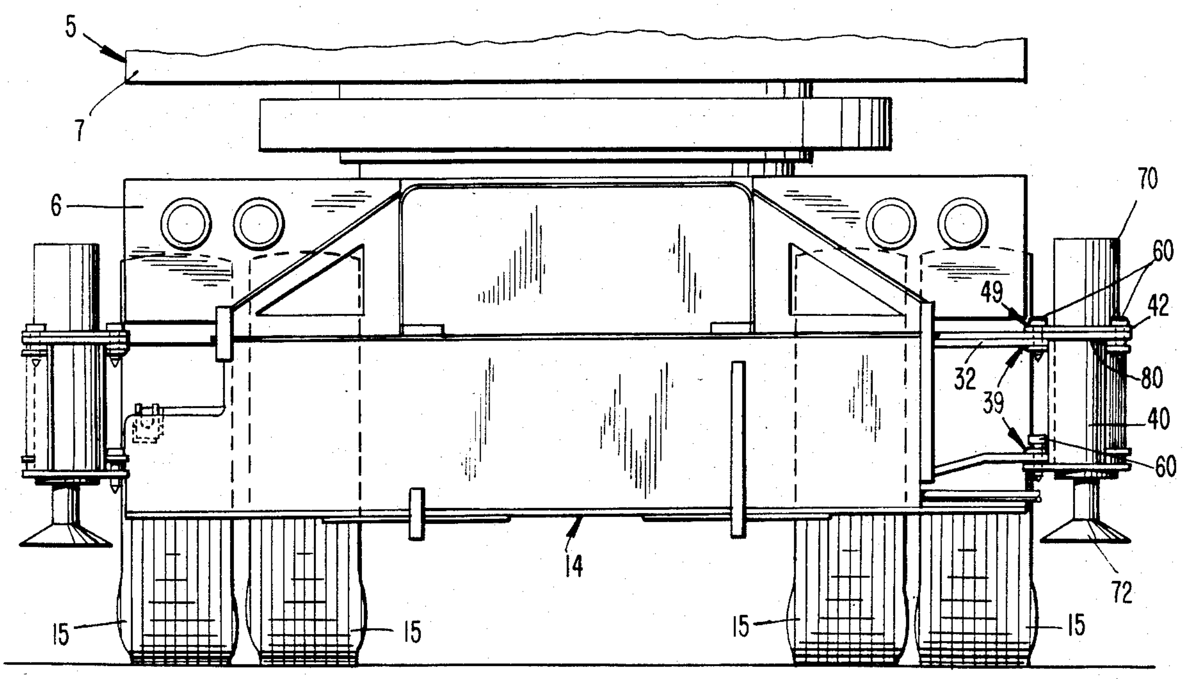
FIG. 3 is an end elevational view of the vehicle of FIG. 2.

With reference now to FIG. 3, the plurality of rear wheels 15 contact a support surface such as the ground and the rear outrigger beam assembly 14 is positioned behind the wheels. A pad 72 extends downwardly from the extension beam 40, with the pad being actuated by a hydraulically powered jack cylinder 70. To enable the vehicle 10 to traverse the ground surface, the pad 72 is retracted so that it will not provide an obstruction while the vehicle is traveling.

Securing the extension beam 40 in a storage position with regard to the vehicle 5 is a locking bar 80. The locking bar 80 is secured on a first end to a hinge portion 39 of an upper plate 32 of the outrigger beam 30 and on a second end to a hinge portion 49 of an upper plate 42 of the extension beam 40 (see also FIG. 2). Preferably, the locking bar 80 is made of steel or a similar strong, hard material. Connecting the two ends of the locking bar 80 to the outrigger beam 30 and the extension beam 40, respectively, are two pins 60.

In order to bring the extension beam 40 into a working position, the locking bar 80 and the pins 60 securing it are removed. Thereafter, the extension beam is rotated clockwise around a hinge line formed by a first, vertically aligned pair of pins 60 which hingedly connect the left side of the outrigger beam 30 to the left side of the extension beam 40 when the extension beam is in the storage position (the top one of these two pins 60 can be seen in FIG. 2). Because two pairs of vertically aligned pins 60 are used, the hinge line may be established on either side of the outrigger beam 30 and the extension beam 40 as desired. The location of the hinge line would depend on whether it is desired to secure the extension beam 40 in a non-working position forwardly or rearwardly of the outrigger beam 30.

Since the outrigger beam 30 is located on a rear portion of the construction vehicle 5, the extension beam 40 will be rotated clockwise until its right side contacts the outrigger beam 30. With regard to the front outrigger beam assembly 12, to bring its extension beams 40 into a storage position, they may be rotated rearwardly or forwardly as the structure of the construction vehicle 5 permits. The two pins 60, which are used to secure the locking bar 80, may be used to secure the hinge portions 49 on the right side of the extension beam 40 to the hinge portions 39 on right side of the outrigger beam 30. Of course, one pin 60 or more than two vertically aligned pins could be used, instead of exactly two vertically aligned pins, if so preferred or so dictated by the circumstances.

Figures 5, 6, 8, 9, 10:
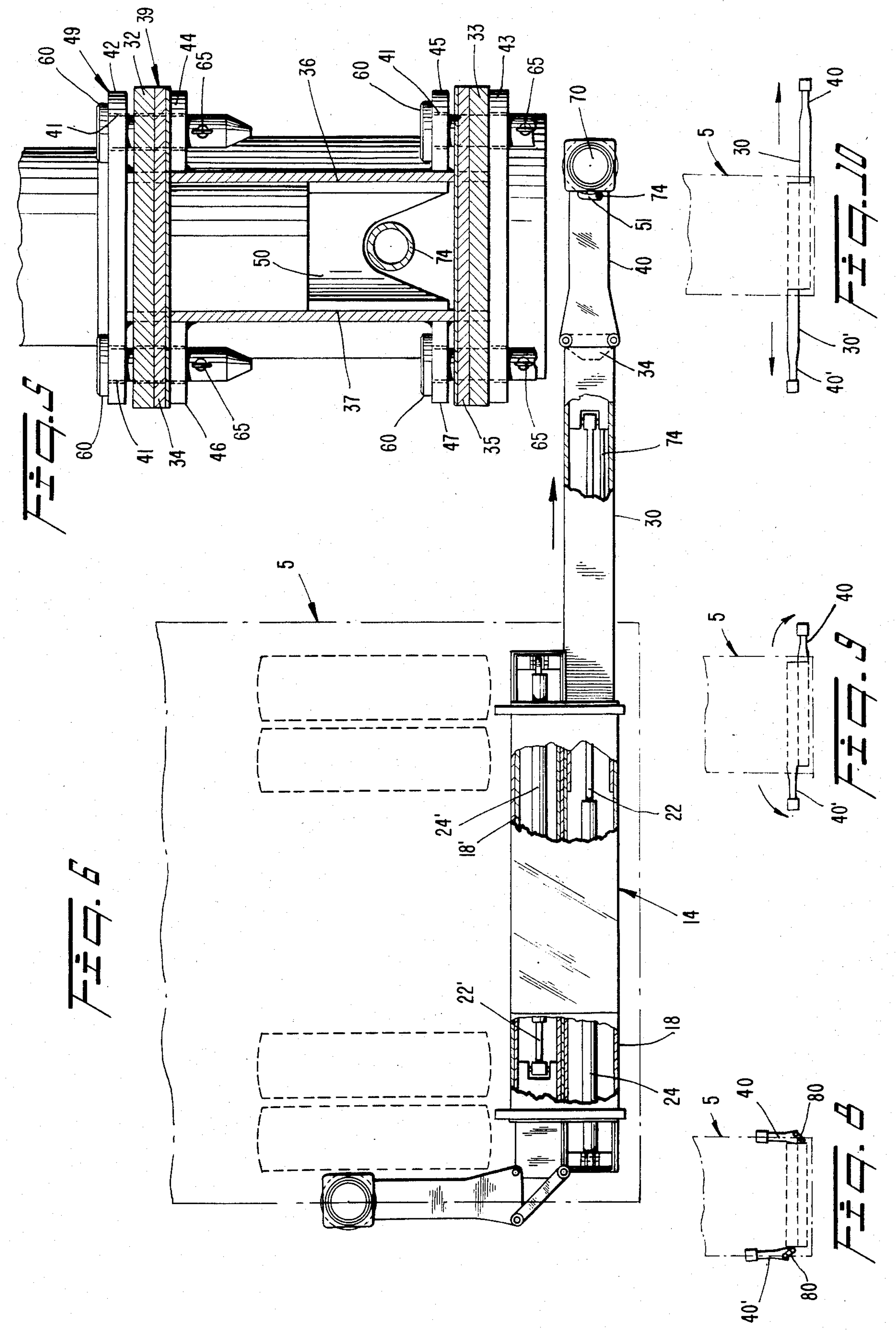
FIG. 5 is an enlarged cross-sectional view taken along line 5—5 of FIG. 4.
FIG. 6 is a plan view of FIG. 4.
FIG. 8 is a schematic plan view of the outrigger beam assembly of the present invention with both extension beams in a stored position.
FIG. 9 is a schematic plan view similar to FIG. 7 with both extension beams located in a working position.
FIG. 10 is a schematic plan view similar to FIG. 7 with both outrigger beams extended.

With reference now to FIG. 5, each pin 60 securing the outrigger beam 30 to the extension beam 40 is itself secured against vertical movement by a removable fastener such as a cotter pin 65. The several pins 60 and the cotter pin 65 associated with each pin 60 are also preferably made of a suitably strong and wear-resistant material such as steel. A hydraulic line or hose 74 conveying hydraulic fluid to the hydraulic cylinder 70 of the pad extension assembly is held in place by a hydraulic hose support plate 50 located in and secured to the extension beam 40 in any conventional fashion such as by welding. Besides the upper plate 42, the extension beam 40 also has a lower plate 43 and a pair of side plates which connect the upper plate to the lower plate (the side plates cannot be seen in FIG. 5 because the side plates of the outrigger beam 30 obscure the view). The upper and lower plates 42, 43 and the two side plates are preferably welded together but they may be secured in any suitable conventional fashion.

Preferably, the several plates are made of steel or another strong, rigid material. Four hinge support plates 44, 45, 46, 47, also preferably made from steel or a similar material, are secured in any conventional fashion such as welding to outer surfaces of the two side plates of the extension beam 40. The four hinge support plates 44, 45, 46, 47 are so situated that, for example, a pin 60 may pass through a respective pin aperture 41 in a right portion of the upper plate 42 and its respective hinge support plate 44, or a right portion of the lower plate 43, and its respective hinge support plate 45.

Included in the outrigger beam 30 are the upper plate 32 and left and right support plates 36, 37 which connect the upper plate to the lower plate 33. Preferably, the four plates 30, 32, 36, 37 are welded together but they may be secured in any suitable conventional fashion. Preferably also, the plates of the outrigger beam 30 are made of steel or a similar strong, hard material. Reinforcing plates 34, 35 made of a suitable strong material such as steel, are respectively secured, preferably by welding, to an underside of the upper plate 32 and to an upper side of the lower plate 33. These reinforcing plates 34, 35 are trapezoidal in shape (see the dotted trapezoidal outline at the outer end of the outrigger beam 30 in FIG. 6). Such reinforcing plates 34 are useful to strengthen the end portion of the outrigger beam 30 and also to properly space, vertically, the outrigger beam 30 with respect to the extension beam 40.

Because the extension beam 40 is secured to the outrigger beam 30 by four selectively removable pins 60, the extension beam can be entirely disconnected from the outrigger beam. Such a disconnection would be useful, for example, if it became necessary to replace the extension beam 40 with one that was longer or shorter. Also, it might be deemed necessary to disconnect the extension beam 40 to replace or repair the hydraulic cylinder 70 or if it was desired to store the extension beam disconnected from the outrigger beam. It might also be deemed necessary to disconnect the extension beams 40 to lighten the vehicle 5 for highway transit. Of course, in most of the above-enumerated instances, it would probably be also necessary to disconnect the hydraulic hose 74.

On the other hand, rather than using four selectively removable pins 60, it would also be feasible to use one or more permanent hinges to connect one side of the extension beam 40 and outrigger beam 30 and one or more removable pins 60 on the other side of the two beams 30, 40 if so desired or so dictated by the circumstances.

Figure 4:
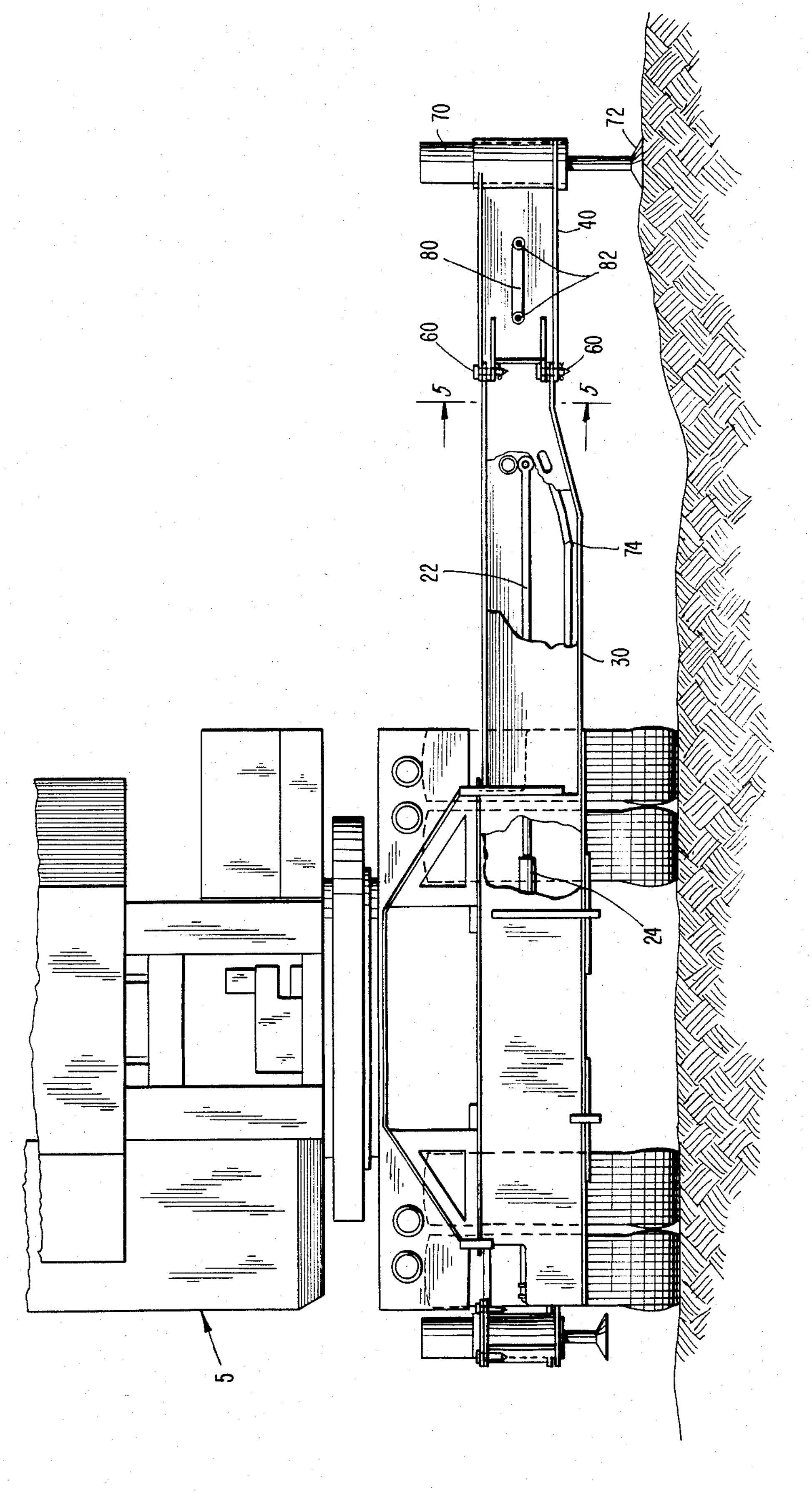
FIG. 4 is a reduced end elevational view, with portions cut-away for the sake of clarity, similar to FIG. 3 with one extension beam connected in a working position to an outrigger beam.

With reference now to FIG. 4, the extension beam 40 can be secured by the pins 60 in a working position on the outrigger beam 30 and the outrigger beam can then be extended, preferably hydraulically. Because the extension beam 40 is secured in a working position on the outrigger beam 30, the locking bar 80 is no longer needed and may be stored on a side of the extension beam 40 by, for example, two hooks 82. A rod 22 can be hydraulically driven by a cylinder 24 to move the outrigger beam 30 horizontally outwardly from a retracted position to an extended position with respect to the vehicle 5. Extending through a portion of the outrigger beam 30 and the extension beam 40 (the latter not being illustrated in cut-away) is the hydraulic line 74 which provides fluid power for the hydraulic jack cylinder 70 to move the pad 72 into a ground contacting position.

It may sometimes be necessary to extend only the front or rear outrigger assemblies 12, 14 or to extend only one of the outrigger beams 30 on one side of the vehicle while the corresponding outrigger beam on the other side is retained in a storage position. This may be dictated by the topography of the surface upon which the vehicle is positioned or by a particular work situation. Of course, the outrigger beam 30 can be placed in any one of numerous positions from fully retracted to fully extended, as desired. It may be necessary sometimes to only partially extend the outrigger beam 30 as dictated by a particular work situation.

With reference now to FIG. 6, a cut-out 51 is provided in the upper plate 42 of the extension beam 40 so that the hydraulic line 74 providing hydraulic fluid for powering the hydraulic jack cylinder 70 may be connected to the hydraulic cylinder. The left and right sides of the rear outrigger beam assembly 14 are each provided with individual rods 22, 22' and cylinders 24, 24' housed in their own casings 18, 18'.

Figure 7:
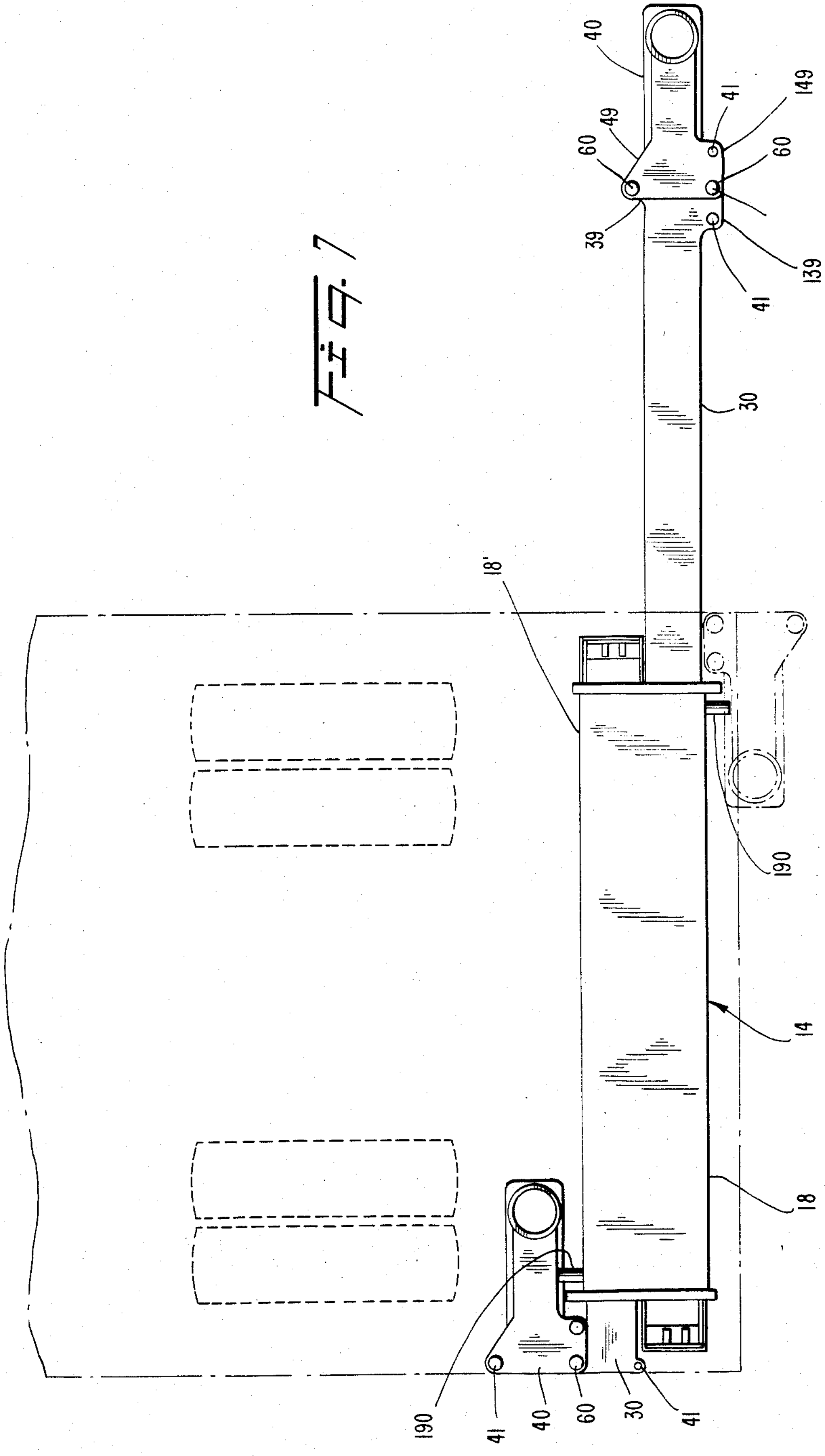
FIG. 7 is a plan view of an alternate embodiment of the outrigger beam assembly according to the present invention.

In an alternate embodiment, a more compact storage arrangement is provided for the extension beam 40 so that the overall width of the construction vehicle 5 is not increased by the utilization of the extension beam. With reference now to FIG. 7, another way of securing the extension beam 40 in a non-working position with respect to the outrigger beam 30 modifies some of the hinge portions 39, 49 of the respective beams. Looking at the outrigger beam 30 from the end of the extension beam 40, the left sides of the cooperating hinge portions 39, 49 have been replaced by modified respective hinge portions or ears 139, 149. Each ear 139, 149 is larger in size than the hinge portions 39, 49 and is provided with two pin apertures 41 through which the securing pins 60 may pass.

When the extension beam 40 is secured in the working position on the outrigger beam 30, respective pins 60 are secured through respective apertures 41 on the hinge portions 39, 49 as in the above-described embodiments. Also, respective pins 60 are secured through the outer cooperating apertures 41 in the ear portions 139, 149. The other or inner apertures 41 in each ear portion 139, 149 remain unused while the extension beam 40 is in the working position.

In order to move the extension beam 40 to a non-working position, the pins 60 connecting the hinge portions 39, 49 are removed. Thereupon, the extension beam 40 can be rotated around the outrigger beam 30 about a hinge line A passing through the remaining pins 60 connecting the respective ear portions 139, 149. When the extension beam has been rotated approximately 180°, the previously unused inner apertures 41 on the ear portions 139, 149 become aligned. Now, the pin 60 may be inserted through the apertures 41 to hold the extension beam in the non-working position. As with the hinge portions 39, 49, the ears 139, 149 may be provided on both the top and the bottom surfaces of the outrigger beam 30 and the extension beam 40. The inner or second apertures 41 may, however, be omitted from each of the ear portions 139, 149 on the bottom surfaces of the outrigger beam and extension beam if desired. Alternatively, separate ear portions (not illustrated) spaced from the above disclosed hinge portions 39, 49 could be provided on the beams 30, 40, instead of the ears 139, 149 with two apertures, to secure the extension beam in the non-working position.

An extension beam stop bar 190 may be secured to the casing 18 of the right portion of the rear outrigger assembly 14 to prevent the extension beam 40 from pivoting too far around the outrigger beam 30 and damaging either the extension beam or the casing 18, 18' of the outrigger assembly 14. Of course, a similar storage arrangement for the extension beam 40 could be provided for the front outrigger assembly 12 if the position of the front outrigger assembly were changed on the vehicle 5 so that the extension beams 40 were able to pivot 180°.

With reference now to FIG. 8, the vehicle 5 is in a transport mode with both rear extension beams 40, 40' being secured in their storage positions adjacent to sides of the vehicle. When it is desired to stabilize the vehicle 5 with the outrigger beam assemblies 12, 14 (see FIG. 1) upon arrival at a work site, the four extension beams 40, 40' (only the two extension beams of the rear outrigger beam assembly being shown in FIG. 8) may be put into their working positions. This is accomplished by removal of each of the locking bars 80 upon removal of the pins 60 connecting the ends of the locking bar to the extension beam 40 and the outrigger beam 30 respectively. Thereupon the extension beam 40 of the right outrigger assembly 12 may be pivoted to a working position around a vertical hinge axis passing through the two pins 60 connecting the left side of the extension beam 40 to the left side of the outrigger beam 30 (see FIG. 9). The left extension beam 40' of the rear outrigger assembly 14 may be similarly pivoted into its working position.

With reference again to FIG. 5, reconnection of two pins 60 through the cooperating hinge portions 39 of the outrigger beam 30 and hinge portions 49 of the extension beam 40 secures the extension beam in the working position. One pin 60 passes through pin apertures 41 in the right portion of the upper plate 42 and the right upper hinge support plate 44 of the extension beam 40 as well as through an aligned pin aperture 41 through the upper plate 32 and the upper reinforcing plate 34 of the outrigger beam 30. Another pin 60 passes through aligned pin apertures 41 in the right lower hinge support plate 45 of the extension beam 40, the lower plate 33 and lower reinforcing plate 35 of the outrigger beam 30 and the right portion of the lower plate 43 of the extension beam. Each pin 60 is then secured in place with a respective cotter pin 65. Similar reconnection of another two pins 60 will secure the left extension beam 40' of the rear outrigger assembly 14 in its working position.

With reference now to FIG. 10, when each of the extension beams 40, 40' have been properly secured in a working position with regard to the outrigger beams 30, 30', then the outrigger beams can be actuated via their respective hydraulic piston and cylinder assemblies to extend the outrigger beams into a working position with regard to the vehicle 5. At this point, the pads 72 located at a lower end of the pad extension hydraulic jack cylinder 70 (see FIG. 3) can be actuated into a ground contacting position so that the vehicle 5 may be braced as desired.

If required, the pads 72 could be extended further vertically than to just a ground contacting position. In such an instance, the entire weight of the vehicle can be supported by the pads 72 on outer ends of the outrigger assemblies rather than the wheels 15 of the vehicle 5. Once the vehicle 5 is lifted (see FIG. 1), the working platform of the crane may also be leveled by differential vertical extension of the several pads 72.

As described, increasing the outrigger spread of a vehicle gives greater stability to the vehicle. Greater stability allows the vehicle, for example, if it is a crane, to pick up a larger load at the same boom length or the same load at a longer boom length without either increasing a counterweight (not shown) of the vehicle or having to use a two-stage hydraulically actuated outrigger beam assembly (not shown). Moreover, the manually pivotable extension beam of the present invention enables the gross weight of the vehicle to be less than would be the case with a conventional vehicle having either a heavier counterweight or a two stage hydraulically actuated outrigger assembly. Such a lesser vehicle weight is advantageous in order to improve the fuel economy of the vehicle when it is moving from place to place and lessens the wear and tear on the vehicle and also on the road surface which is traversed by the vehicle.

The principles, preferred embodiments and modes of operation of the present invention have been described in the foregoing specification. The invention which is intended to be protected herein should not, however, be construed as limited to the particular forms disclosed, since these are to be regarded as illustrative rather than restrictive. Variations and changes may be made by those skilled in the art without departing from the spirit of the present invention. Accordingly, it is expressly intended that all such variations and changes which fall within the spirit and scope of the present invention as defined in the claims be embraced hereby.

What is claimed is:

1. An outrigger beam assembly for a highway transportable vehicle having a frame, such as a construction vehicle, comprising:

at least one telescopically extensible stage outrigger beam positioned beneath the frame, having a single stage and an outer end;

means for permanently mounting said outrigger beam on said frame so that said outrigger beam is telescopically extensible beyond an edge of said frame and telescopically retractable to a retracted position where said outer end is adjacent said edge, said permanently mounting means being fixed relative to said frame;

an extension beam connected to said outer end of said at least one outrigger beam and selectively pivotable with respect thereto about a vertical axis through an angle of substantially 180° between a working position where said extension beam is substantially colinear with said outrigger beam and a non-working position, said extension beam at said non-working position is substantially within a peripheral contour of said vehicle when said outrigger beam is in said retracted position; and securing means for securing said extension beam to said at least one outrigger beam in both said working and non-working positions wherein, in said working position, two horizontally spaced apart vertical hinge lines are formed by cooperating portions of said extension beam and said outrigger beam, one of said hinge lines being located on either side of a central axis of said outrigger beam and wherein said extension beam is pivoted around one of said hinge lines to bring said extension beam into said non-working position thereby spacing apart portions of said extension beam and said outrigger beam which cooperated to form said other hinge line.

2. The outrigger beam assembly of claim 1 further comprising hydraulic means for driving said mounting means.

3. The outrigger beam assembly of claim 1 further comprising a jack cylinder and pad assembly located on an outer end of said extension beam, a pad of said assembly being selectively vertically extensible to contact a support surface.

4. The outrigger beam assembly of claim 1 wherein said securing means includes four selectively removable pins, each of said pins securing a respective first hinge portion located on an outer end of said outrigger beam to a corresponding second hinge portion located on an inner end of said extension beam.

5. The outrigger beam assembly of claim 4 wherein removal of two vertically aligned pins will disconnect two first hinge portions from two second hinge portions and establish a hinge line on an opposite side of said extension beam, said extension beam pivoted around said hinge line to move said extension beam from said working position to said non-working position.

6. The outrigger beam assembly of claim 5 wherein said hinge portions around which said extension beam is pivoted to said non-working position also each include a second aperture, and wherein said second apertures become aligned as said extension beam is pivoted to said non-working position and wherein a pin is secured through said aligned pair of second apertures to secure said extension beam in said non-working position.

7. An outrigger beam assembly for stabilizing a highway transportable construction vehicle having a frame, comprising:

an outrigger beam positioned beneath the frame, having an outer end and including a single stage hydraulic actuator;

means for permanently mounting said outrigger beam for generally horizontal, telescoping movement between a horizontally retracted position where said outer end is adjacent said frame, and a horizontally extended position beyond said frame, said outrigger beam having on said outer end thereof at least two first hinge portions;

an extension beam mounted for pivotal movement around a vertical axis through an angle of substantially 180° relative to an outer end of said outrigger beam with at least two second hinge portions located on an inner end of said extension beam, each of said second hinge portions cooperating with one of said first hinge portions when said extension beam is in a working position where said extension beam is substantially colinear with said outrigger beam;

a plurality of selectively removable pins which secure said extension beam to said outrigger beam, one pin securing each of said first hinge portions to a respective one of said second hinge portions, wherein said hinge portions of said extension beam and said outrigger beam cooperate in said working position to form two horizontally spaced apart vertical hinge lines, one of said hinge lines extending through each of said cooperating hinge portions on said extension beam and outrigger beam and each said hinge line being located on a corresponding side of a vertical axis bisecting said outrigger beam and wherein said extension beam is pivoted around one of said hinge lines to bring said extension beam into said non-working position thereby spacing apart hinge positions of said extension beam and said outrigger beam which formerly cooperated to form said other hinge line, and wherein said extension beam at said non-working position is substantially within the peripheral contour of said vehicle when said outrigger beam is in said horizontally retracted position; and securing means to secure said extension beam in said non-working position.

8. The outrigger beam assembly of claim 7 further comprising hydraulic means for driving said mounting means.

9. The outrigger beam assembly of claim 1 or 7 wherein two outrigger beams and two extension beams are provided, said two outrigger beams being extendable from opposing sides of the vehicle.

10. The outrigger beam assembly of claim 7 wherein said securing means includes cooperating hinge portions on said extension beam and said outrigger beam with a pair of apertures being provided on said cooperating hinge portions which apertures become aligned when said extension beam is rotated to said non-working position whereby a pin can be inserted through said apertures to secure said extension beam in said non-working position.

* * * * *